J. M. HARR.
EGG HOLDER AND CARRIER.
APPLICATION FILED OCT. 12, 1914.
1,174,005.
Patented Feb. 29, 1916.
2 SHEETS—SHEET 1.
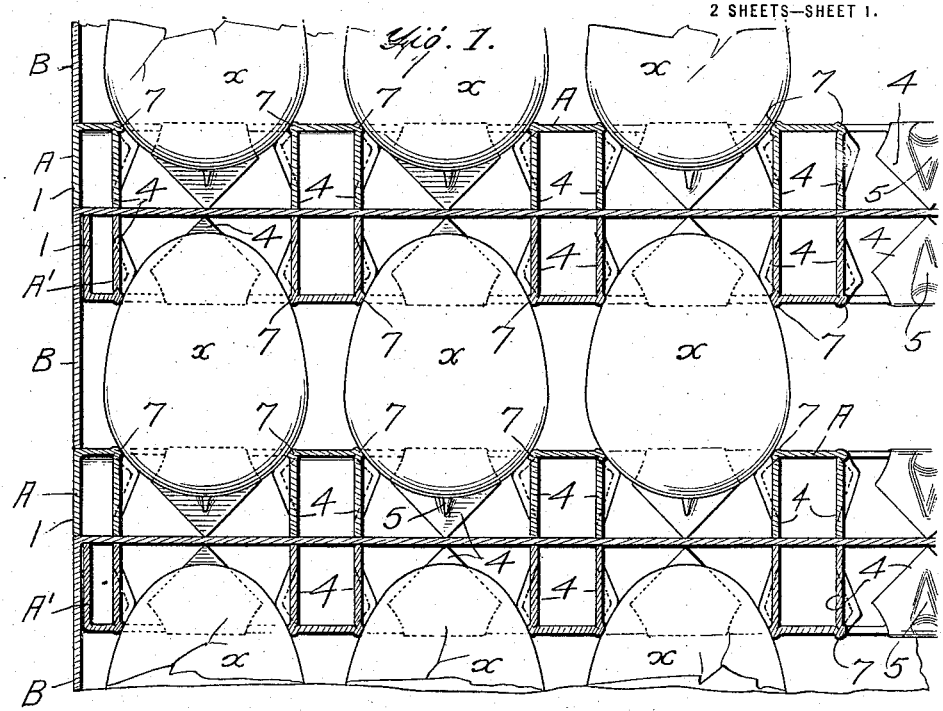
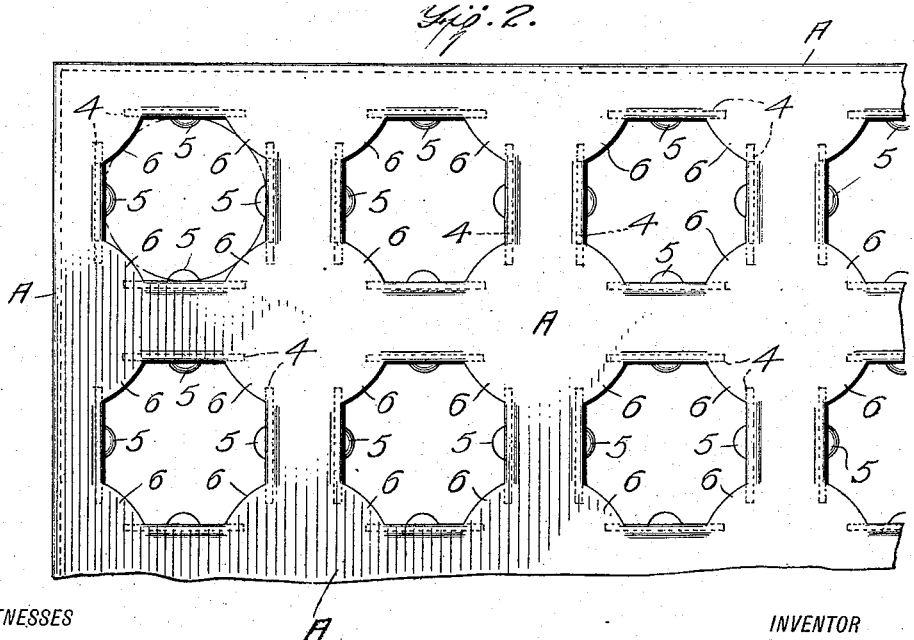
WITNESSES
INVENTOR
JESSE M. HARR,
BY
ATTORNEYS J. M. HARR.
EGG HOLDER AND CARRIER.
APPLICATION FILED OCT. 12, 1914.
1,174,005.
Patented Feb. 29, 1916.
2 SHEETS—SHEET 2.
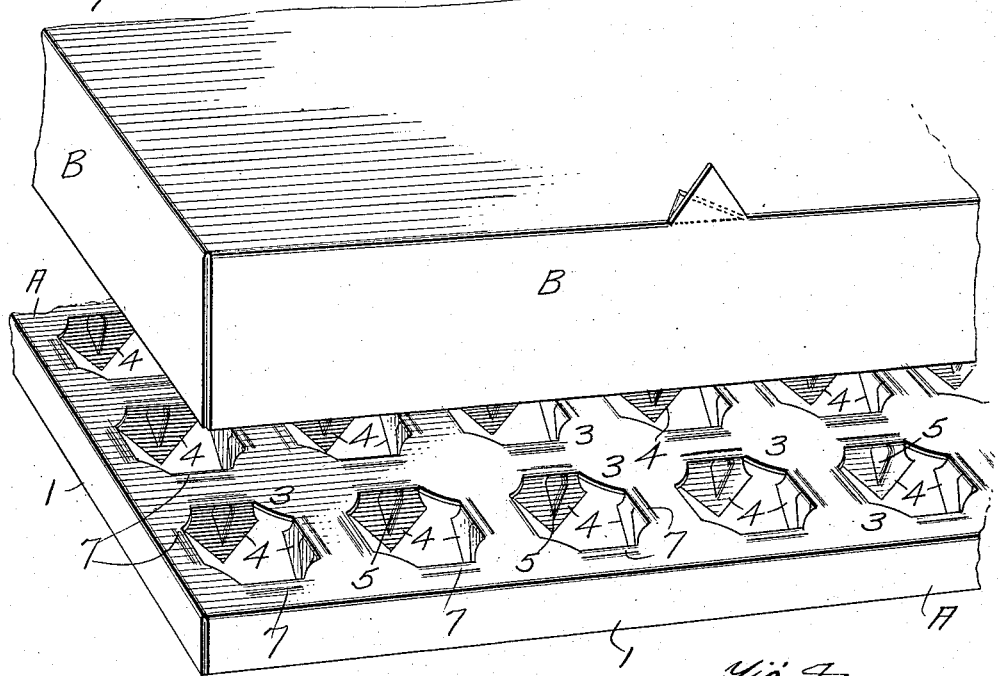
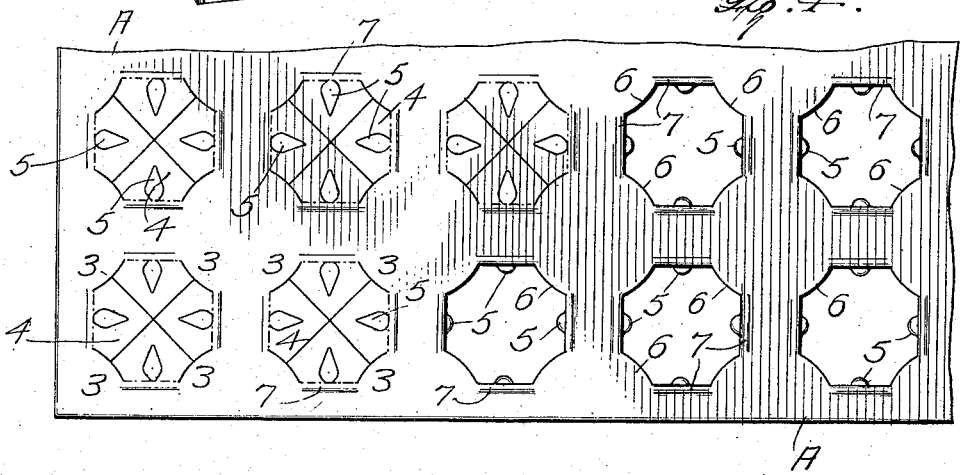
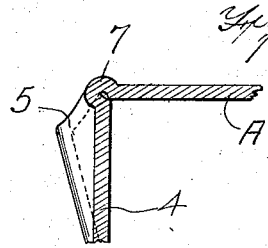
WITNESSES
INVENTOR
JESSE M. HARR,
BY
ATTORNEYS

UNITED STATES PATENT OFFICE.

JESSE M. HARR, OF WASHINGTON, DISTRICT OF COLUMBIA.

EGG HOLDER AND CARRIER.

1,174,005.   Specification of Letters Patent.   Patented Feb. 29, 1916.

Application filed October 12, 1914. Serial No. 866,373.

*To all whom it may concern:*

Be it known that I, JESSE M. HARR, a citizen of the United States, and resident of Washington, in the District of Columbia, have made an Improved Egg Holder and Carrier, of which the following is a specification.

The chief object of my invention is to secure greater safety for eggs in shipping, rough handling, and storage, by means which may be cheaply produced.

The details of construction, arrangement, and combination of parts are as hereinafter described, and illustrated in the accompanying drawing, in which—

Figure 1 is a vertical section of a portion of my egg-holder and -carrier, eggs being shown supported therein. Fig. 2 is a plan view of an egg tray forming the chief feature of my invention. Fig. 3 is a perspective view of such egg tray, together with flanged cover, the two being disassociated. Fig. 4 is a plan view of the egg tray and portion of the view illustrating the arrangement of cuts or slits for producing openings for receiving the bases of the eggs. Fig. 5 is an enlarged detail section of a portion of the egg tray.

My egg holder and carrier is composed of three principal parts, which are indicated by letters A, A', and B. The part A serves as a base holder or support for eggs, and the top or inverted part A' is duplicate in structure and serves as a holder or spacer for the tops of the eggs, while B is a flanged cover. The base portion or egg tray A is illustrated in plan view in Figs. 2 and 4, and in perspective in Fig. 3, and a description thereof will suffice for both it and the top holder A', since they are duplicates. Each is formed from a sheet of paste-board of the requisite thickness and provided with a vertical rim flange 1.

The openings for the base of the eggs are formed in the tray A by slitting the same on crossed lines 2, as shown in the left-hand side of Fig. 4, and also by curved slits 3, which intersect the straight slits 2. Taper or triangular tongues 4 are thus formed, the same being substantially triangular in shape, and these, when bent into vertical position, as shown in Fig. 1, form props or stays for the body or horizontal portion of the tray by reason of the points of said props resting on a base. Such base may be a paste-board sheet or the bottom of a box; or it may be the top of one of the covers B, as will be understood by reference to Fig. 1, where eggs are arranged in a series of tiers.

As illustrated best in Fig. 4, each of the tongues or props is provided with a protuberance or swell 5 in its inner or upper side contiguous to the hinge of said tongues, which bulge may be produced by embossing, or in any other suitable manner. When an egg is placed in position on the tray A, its base comes in contact with these protuberances 5, and thus bends the tongues 4 downward from the position in the left-hand side of Fig. 4 into the vertical position shown in right-hand portion of such figure. It is apparent that, by providing the tray A, A', with vertical tongues forming props, as stated, the body of the tray may be made of thinner material than would be otherwise practicable.

Each of the curved slits 3, before referred to, serves to form a rounded projection 6 at the corner of each opening, as will be understood by reference to Figs. 2, 3, 4. Thus, when an egg is placed in an opening in the tray, it has a bearing at eight points, and spaces are provided between the several points of bearing through which air circulates freely. The paste-board forming the tray is crimped at the edges of the openings where the tongues or props 4 are turned down, thereby forming a rounded shoulder 7, as will be understood by reference to Figs. 1 and 5. The shoulder 7 thus produced forms, as it were, a cushion support for an egg, and the crimping strengthens the thin material of the tray so that eggs are supported without danger of breaking down the parts on which they rest.

The bulges or projections 6 formed at the corners of the openings in the tray not only serve as bearing points and supports for the eggs, but strengthen the paste-board sheet at the corners, which is a feature of some importance. Thus, by crimping the paste-board sheet adjacent to the bases of the tongues and props 4, rounded cushions or shoulders are provided and the rounded corner portions 6 aid in strengthening the tray and holder and holds the eggs in upright position, while providing sufficient ventilation. By providing a support for the eggs, when the top holder A' is removed for unpacking, the eggs are prevented from falling against each other and becoming broken.

It will be understood from the foregoing description that the eggs are supported entirely by the tray or base part A, and that the top part A' has the same construction as A, but is in inverted position and serves ordinarily merely as a top holder for the eggs. If, however, the entire egg holder and carrier be inverted, of course part A and A' interchange functions, the part A' then becoming the egg support and the part or tray A becoming merely a top holder for the eggs. In other words it will be understood that the entire egg holder and carrier may be used either side up. As shown in Fig. 1, props 4 of the tray or base part A rest upon the cover B, which is next below; but, as before intimated, in place of this cover, the tray may rest directly upon a paste-board sheet. Thus the cover B whose vertical rim flanges are shown in Fig. 1 resting upon the tray A, serves as a horizontal partition between each top holder A' and the tray next above it.

It is contemplated making the tray A and holder A' of a size adapted to hold three dozen eggs; in other words, there will be six openings on each side of the rectangular tray and holder; but it is to be understood that these parts A, A', may be divided into four duplicate sections or parts, so that each would contain nine eggs.

In practice, each part A, A', will be formed by cutting and stamping dies and may be thus produced very cheaply and expeditiously.

What I claim is:—

1. An egg-holder formed of a sheet of thin material having a series of egg-receiving openings and provided at the edges of said openings with integral tongues which, when adjusted vertically, constitute props for the body of the sheet, the edges of the sheet adjacent to the bases of such props being crimped and thus provided with a thickened part constituting a shoulder and cushion 7, as described.

2. An egg-holder formed of a sheet of thin material having a series of egg-receiving openings and triangular integral tongues adapted to be projected vertically from the edges of said openings, the portions of the sheet intervening the said tongues being formed as rounded inward projections 6 which are located at the corners of the openings and serve as points of bearing for an egg when placed in position in the openings.

3. An egg holder and -carrier comprising a base support and top holder which are duplicated in construction, each being formed of a sheet of thin material provided with openings for receiving the end portions of eggs, and with flexible integral tongues projecting from the edges of the openings, which, when in vertical position, serve as props and stays, and a cover provided with pendent flanges at the edge, said cover being placed over the top egg-holder and its top resting thereon out of contact with the eggs, while its flanges rest on the bottom of the base support, as shown and described.

4. In an egg holder and -carrier, the combination with horizontal parallel division plates, of an egg support arranged on the bottom division plate, and an inverted holder arranged adjacent to the upper division plate, both the said support and holder having openings, and tongues projecting from the edges of such openings downward and upward, the same constituting egg supports and their ends abutting the division plates below and above, as described.

JESSE M. HARR.

Witnesses:
SOLON C. KEMON,
AMOS W. HART.